G. GOEWEY.
APPARATUS FOR TREATING AND AGING SPIRITUOUS LIQUORS.

No. 183,661.  Patented Oct. 24, 1876.

Witnesses  
Saml. J. Van Staavorn.  
Jos. B. Connolly

Inventor  
George Goewey,  
Connolly Bros., Attorneys

UNITED STATES PATENT OFFICE.

GEORGE GOEWEY, OF PHILADELPHIA, PENNSYLVANIA, ASSIGNOR OF ONE-HALF HIS RIGHT TO JOHN YEARSLY, OF SAME PLACE.

IMPROVEMENT IN APPARATUS FOR TREATING AND AGING SPIRITUOUS LIQUORS.

Specification forming part of Letters Patent No. 183,661, dated October 24, 1876; application filed May 4, 1876.

*To all whom it may concern:*

Be it known that I, GEORGE GOEWEY, of Philadelphia, in the county of Philadelphia and State of Pennsylvania, have invented certain new and useful Improvements in Apparatus for the Treatment and Aging of Spirituous Liquors; and do hereby declare the following to be a full, clear, and exact description of the invention, such as will enable others skilled in the art to which it pertains to make and use it, reference being had to the accompanying drawings, which form part of this specification, in which—

Figure 1:
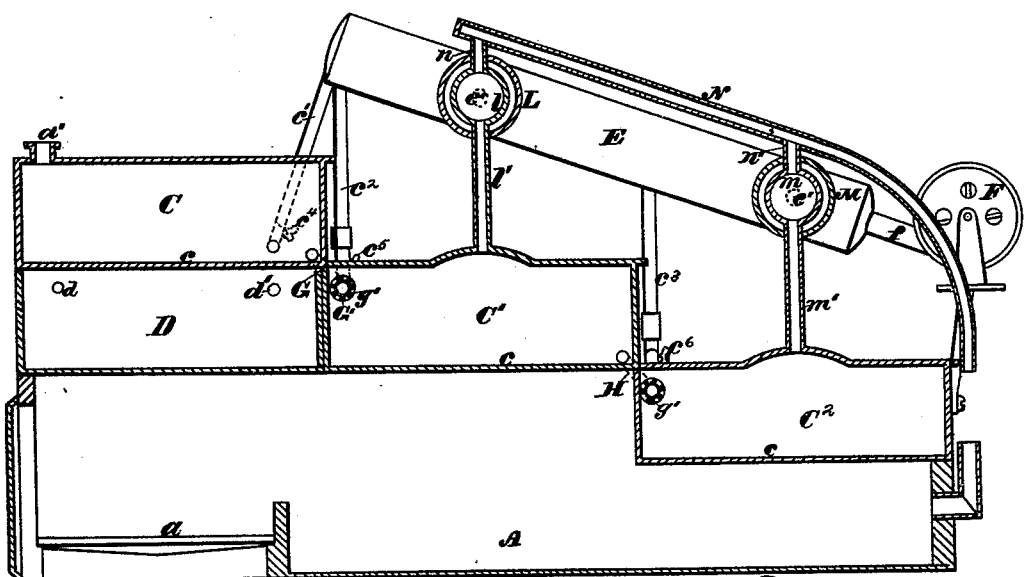
Figure 2:
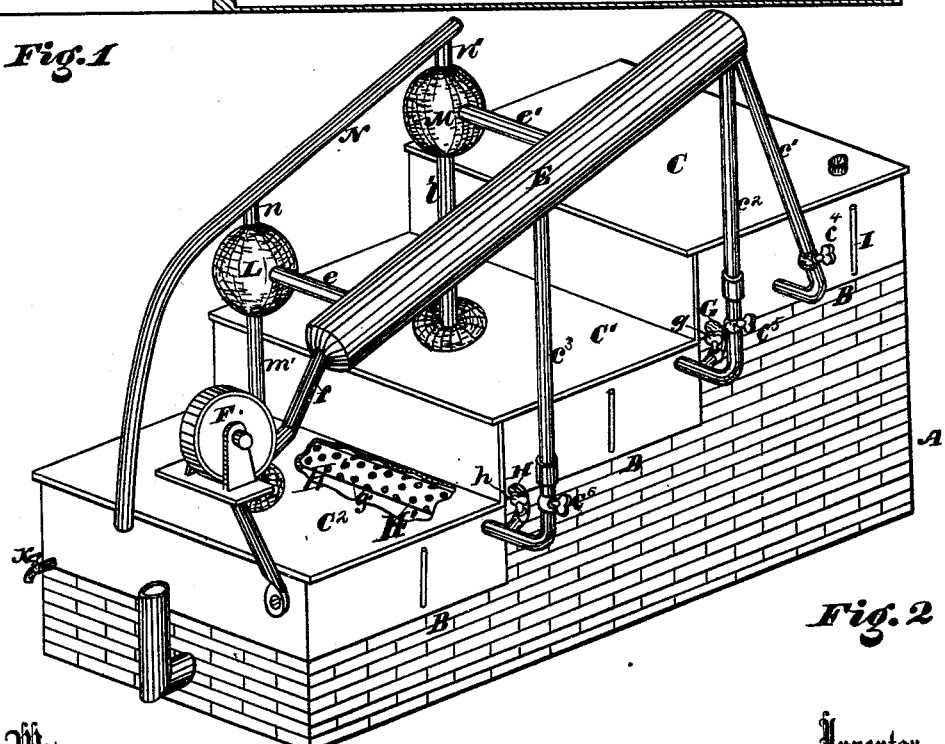

Figure 1 is a vertical longitudinal section, and Fig. 2 is a perspective, of my invention.

My invention has reference to the process and apparatus for which Letters Patent of the United States, dated June 29, 1869, No. 91,840, and August 5, 1873, No. 141,554, were issued and granted to me.

My improvements herein described have for their object to cheapen, simplify, and render more efficient the appliances described in the above-mentioned patents.

Said improvements have relation principally to the following points: first, to making the liquor-pans wholly separate from and independent of each other, and formed with flat bottoms, so as to facilitate construction, removal, and repairs, and permit all the contents of an upper pan to flow into the one next below it, through the connecting-pipe, without requiring any of said contents to be drawn off through a separate exit-port, as was heretofore necessary; second, to the combination, with the pans thus formed, of a water-pan, air-trunk, fan-blower, condenser, and communicating pipes, making up a complete apparatus, for the purpose set forth.

Referring to the accompanying drawing, A A show the brick side walls of a furnace, the upper parts of said walls being constructed to form series of steps B B. C $C^1$ $C^2$ are pans (of which any number desired may be employed) having flat bottoms $c$ $c$, the bottom of one of said pans being on a level with the top of the pan next below it. These pans are made separately from and independent of each other, so as to render them more easily and cheaply made, and to facilitate their transportation and repair when needed. D is a water-pan, located just below the pan C and above the grate $a$, having inlet and outlet ports, $d$ $d'$, respectively, $a'$ is an inlet to the pan C, through which the liquors are poured. E is an air-trunk, connected with a fan-blower, F, by a pipe, $f$. Said trunk forms connections also with the pans C $C^1$ $C^2$ by pipes $c^1$ $c^2$ $c^3$, which have, respectively, cocks $c^4$ $c^5$ $c^6$. G is a short curved pipe connecting the pan C with the pipe $c^2$, having a cock, $g$, and H is a similar pipe connecting the pan $C^1$ with the pipe $c^3$, having a cock, $h$. I is a gage for determining the temperature of the contents of the pan C, and K is a bib-cock for drawing off the liquors from the pan $C^2$. L $l$ and M $m$ are condensing vessels or globes of substantially the same construction as those shown and described in my aforesaid patent of August 5, 1873. The interior globes $l$ $m$ connect, respectively, with the pans $C^1$ $C^2$, by pipes $l'$ $m'$, and with a common exit air-shaft, N, by short pipes $n$ $n'$. The exterior globes L M connect with the air-trunk E by pipes $e$ $e'$, having exit-ports on the sides opposite said pipes.

The operation is substantially as follows: The liquor to be treated is first poured into the pan C until the latter is nearly filled, the cock $g$ being closed. Fire being started in the grate $a$, the liquor in the pan C is heated to a temperature of from 115° to 165° Fahrenheit. The fan-blower is then put in motion and the cock $g$ opened, allowing the liquor to pass through the pipe G into the pipe $c^2$, where it mingles with the air from the trunk E. The liquor and air, thus mingled or brought into contact, pass in together to the tube G', and out of said tube, through the perforations $g'$, into the pan $C^1$. From the pan $C^1$ the liquor passes into the pan $C^2$ through the pipe H and tube H', whence it is drawn off through the cock K and barreled. The object of the pipe $c^1$ is to prevent a vacuum in the pan C. The globes L $l$ M $m$ serve to condense the vapors which arise from the pans $C^1$ $C^2$. The air from the trunk E, carried by the pipes $e$ $e'$ to the globes L M, circulating around the interior globes $l$ $m$, condense the vaporous contents of the latter, the liquid falling back into the pans $C^1$ $C^2$. Instead of air from the trunk E, water from any suitable source may be used to condense the vapors in said globes $l\ m$.

As soon as the liquor has been drawn from the pan C into $C^1$, the cock G is closed and said pan C replenished, so as to keep up a continuous operation of the apparatus.

It will be understood, of course, that the pan D is to be supplied with water which will be sufficiently heated to bring the liquor in the pan C to the temperature already suggested.

What I claim as my invention is—

1. In an apparatus for aging and treating spirituous liquors, as herein described, the pans C $C^1$, &c., formed with flat bottoms and made separate from and independent of each other, the bottom of each pan being on a line with the top of the next lower pan, as set forth.

2. The combination of the separate flat-bottomed pans C $C^1$ $C^2$, water-pan D, air-trunk E, and condensers L $l$ M $m$ with communicating pipes, constructed substantially as herein shown and described.

In testimony that I claim the foregoing I have hereunto set my hand this 1st day of May, 1876.

GEORGE GOEWEY.

Witnesses:
 JOHN RODGERS,
 SAML. J. VAN STAVOREN.